Dec. 19, 1967 F. L. WRIGHT 3,358,498
APPARATUS FOR TESTING THE COMPRESSIVE
STRENGTH OF BALLS
Filed Dec. 9, 1964
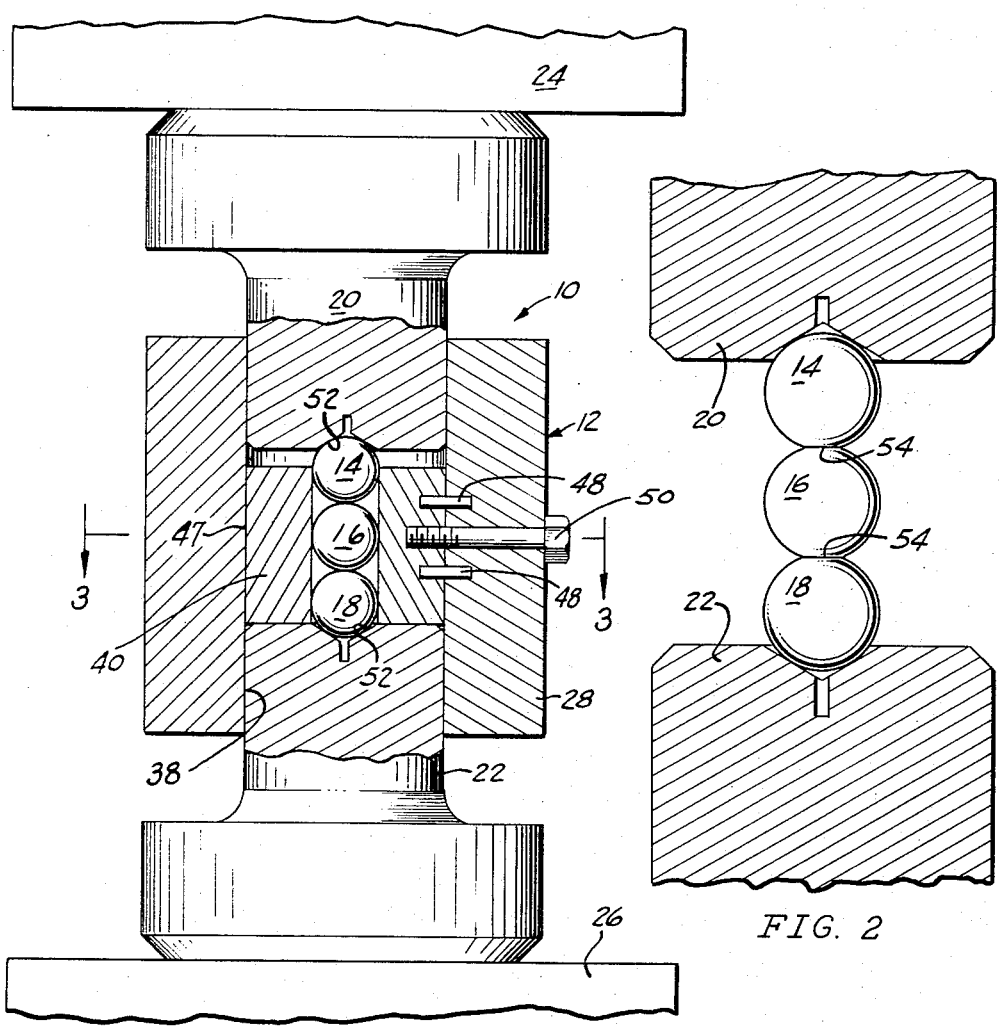
FIG. 1
FIG. 2
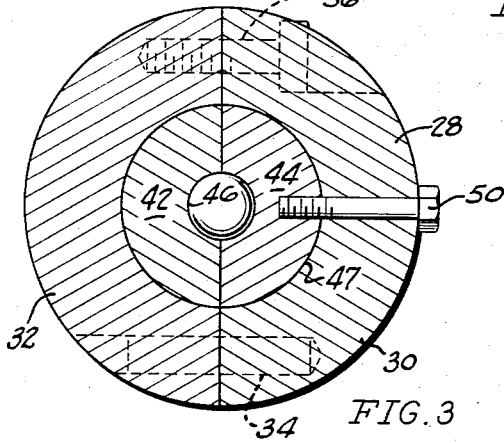
FIG. 3
INVENTOR
FRANK L. WRIGHT
BY Olsen and Stephenson
ATTORNEY U nited States Patent Office 3,358,498
Patented Dec. 19, 1967

3,358,498
APPARATUS FOR TESTING THE COMPRESSIVE STRENGTH OF BALLS
Frank L. Wright, Middletown, Ohio, assignor to Hoover Ball and Bearing Company, Saline, Mich., a corporation of Michigan
Filed Dec. 9, 1964, Ser. No. 417,176
2 Claims. (Cl. 73—103)

ABSTRACT OF THE DISCLOSURE

Method and apparatus for testing the compressive strength of rigid balls in which a three ball stack is initially contained in a fixture assembly which keeps the balls in axially aligned positions. Accurately aligned compressive forces are applied to the stack until the engaged portions of adjacent balls are flattened. The fixture assembly is then removed and the compressive forces are increased on the resulting free stack of balls until one of the balls is crushed.

This invention relates generally to apparatus for strength testing manufactured parts, and more particularly to improved apparatus for testing the compressive strength of balls formed of metal and the like.

Manufactured metal balls are commonly tested with respect to their compressive strength, namely, the force required to crush a ball. This information, for the various sizes, qualities, and materials from which balls are made, is of value to purchasers and users of balls. The testing equipment commonly used in the past for obtaining this information consisted of a vertically movable plunger which was movable into engagement with one end of a stack of balls, there usually being three balls in the stack. The compressive force required to crush one of the balls was then measured. Such apparatus gives test results which are not entirely accurate because the frictional forces exerted on the plunger by the support through which it is moved to apply compressive forces to the stack of balls has a varying effect on the test results. Any misalignment of the plunger with respect to the stationary support affects the magnitude of the friction, and any misalignment of the balls in the stack tends to cock the plunger and thus affect the friction. It is an object of this invention, therefore, to provide improved apparatus for testing the compressive strength of balls which provides for an accurate alignment of a stack of balls prior to an application of measured compressive forces thereto, and insures alignment of the stack with the plunger which applies the compressive force thereto so as to insure an accurate measurement of the crush resistance of the balls being tested.

A further object of this invention is to provide apparatus for testing the compressive strength of balls which is readily adaptable to balls of different sizes, is easy to operate, and provides accurate test results.

Further objects, features and advantages of this invention will become apparent from a consideration of the following description, the appended claims, and the accompanying drawing in which:

FIGURE 1 is a side elevational view of the apparatus of this invention, with some parts broken away and other parts shown in section for the purpose of clarity;

FIGURE 2 is a fragmentary side elevational view illustrating the final step in the crush testing of balls according to the method of this invention; and FIGURE 3 is a transverse sectional view of the apparatus of this invention looking substantially along the line 3—3 in FIG. 1.

With reference to the drawing, the apparatus of this invention, indicated generally at 10, is illustrated in FIG. 1 as including a fixturing assembly 12 capable of maintaining a stack of three balls 14, 16, and 18 in a vertically extending axially aligned relation, and a pair of axially aligned plungers 20 and 22 capable of applying compressive forces to the stack of balls 14, 16 and 18. The plungers 20 and 22 are shown mounted on upper and lower platens 24 and 26, respectively, which form part of a conventional load applying machine (not shown) capable of providing for a relative movement of the platens 24 and 26 such that they are moved toward each other. In a usual machine, the lower platen 26 is stationary and the upper platen 24 is movable downwardly toward the lower platen 26. Such a conventional machine includes a suitable gauge associated with the movable platen 24 or 26 which indicates the compression force being exerted on the movable plunger by the movable platen 24 or 26.

The fixture assembly 12 includes a split body 28 formed in vertically extending halves 30 and 32 which are releasably connected together, as shown in FIG. 3, by symmetrically arranged alignment pins 34 (only one of which is shown) and similarly arranged screws 36 (only one of which is shown). When the halves 30 and 32 are connected together to form the body 28, a vertically extending bore 38 is formed. The bore 38 is accurately machined so that it is of a diameter only slightly greater than the diameters of the plungers 20 and 22, which are of the same diameter and which are also accurately machined so that they are precisely axially aligned with the bore 38. As a result, the plungers 20 and 22 are movable axially of the bore 38 with a minimum of frictional force applied to the plungers 20 and 22 by the body 28.

A ball alignment block 40 is removably mounted on the body 28 at a position within the bore 38 and between the upper and lower ends of the bore 38. For ease of assembly of the alignment block 40 with the body 28, the block 40 is likewise made in two halves 42 and 44 which, when they are assembled as shown in FIG. 3 to form the block 40, form a vertically extending bore 46 and a cylindrical outer surface 47 which is parallel to the bore 46. A plurality of mounting pins 48, only two of which are shown, extend between the alignment block 40 and the body 28 so as to position the block 40 on the body 28 such that the surface of bore 38 pressure engages the surface 47 of block 40 so as to hold block 40 in a fixed position. One or more screws 50 are extended radially through the body 28 into engagement with the block 40 for maintaining the block 40 in a mounted position on the body 28.

The bore 46 in the alignment block 40 is accurately machined so that it is of a diameter only slightly greater than the diameter of the finished balls 14, 16 and 18 which are to be tested in the apparatus 10. In the use of the apparatus 10 a number of alignment blocks 40 will be provided, with the bores 46 being of varying diameters corresponding to the varying diameters of the balls which are being manufactured and are to be tested in the apparatus 10. Since an alignment block 40 is readily removable from a supporting body 28, balls of varying diameters can readily be selectively tested.

In the use of the apparatus of this invention, the ball alignment block 40 is mounted on the supporting body 28 as shown in FIGS. 1 and 3, to form the fixturing assembly 12, which is then positioned on the lower plunger 22 as shown in FIG. 1 so that the upper end of the plunger 22 engages the lower end of the block 40. Balls 14, 16 and 18 are dropped into the bore 46, and plunger 20 is moved downwardly in the bore 38 until it engages the top ball 14. As shown in FIG. 1, the bore 46 is of a length less than the combined diameters of the three balls 14, 16 and 18 so that the top ball 14 projects out of the upper end of the bore 46. In the illustrated embodiment of the invention, the plungers 20 and 22 are formed with cavities 52 to facilitate engagement of the plungers 20 and 22 with the balls 14 and 18, respectively.

The platens 24 and 26 are then moved toward each other so that they exert compressive forces on the top and bottom ends of the stack of balls 14, 16 and 18. The balls 14, 16 and 18 are accurately axially aligned, by virtue of the fixturing apparatus 12, and the pistons 20 and 22 are also accurately axially aligned, by virtue of the bore 38, with the stack of balls 14, 16 and 18 so that accurately aligned vertically opposite forces are applied to top and bottom ends of the stack of balls 14, 16 and 18. The plungers 20 and 22 are only moved toward each other at this time sufficiently to apply a pre-load force to the stack of balls 14, 16 and 18 sufficient to flatten the engaged portions of the balls 14, 16 and 18 which, prior to flattening, are in point-to-point engagement. The balls 14, 16 and 18 are then formed with flattened surface portions 54 which are shown exaggerated in FIG. 2 for the purpose of clarity.

As soon as the pre-load force has been applied, the motion of the platens 24 and 26 toward each other is discontinued, but the pre-load force on the stack of balls is maintained. The fixture assembly 12 is then removed from the ball stack by removing screws 36 and sliding body halves 30 and 32, along with block halves 42 and 44, apart until pins 34 are cleared. The stack of balls 14, 16 and 18 are then free of the fixture assembly 12 and are in compression between plungers 20 and 22 as shown in FIG. 2. The motion of the platens 24 and 26 is then resumed to gradually increase the compressive force applied to the stack of balls 14, 16 and 18 until a specified load limit is attained or until one of the balls 14, 16 or 18 is crushed. The force at which the ball is crushed is then recorded. A guard (not shown) can be placed around the stack of balls and the plungers 20 and 22 during the application of compressive forces to the balls after the fixture assembly has been removed, if desired for safety purposes.

From the above description it is seen that this invention provides apparatus 10 capable of providing for a final "hands off" compression testing of a stack of balls 14, 16 and 18 in which the frictional forces which normally affect the accuracy of the test results are avoided, and axial alignment of the balls in the stack is assured. As a result, in the use of the apparatus of this invention, an accurate measurement of the crush resistance of balls is obtained.

It will be understood that the method and apparatus for testing the compressive strength of balls which is herein disclosed and described is presented for purposes of explanation and illustration and is not intended to indicate limits of the invention, the scope of which is defined by the following claims.

What is claimed is:

1. Apparatus for testing the compressive strength of rigid balls of a predetermined diameter comprising a longitudinally separable fixture assembly, said assembly including a body having a longitudinally extending bore and a ball alignment block disposed between the ends of said bore and having a longitudinally extending opening therethrough axially aligned with said bore, said opening being of a diameter to support said balls against movement in a direction transversely of said opening, said block opening being of a length to accommodate a stack of said balls disposed therein in a coaxial relation therewith such that said stack extends from opposite ends of said opening so that said stack can be subjected to compressive forces extending along the axis thereof by inserting compressing members in opposite ends of said bore into engagement with opposite ends of said stack.

2. Apparatus for testing the compressive strength of rigid balls of a predetermined diameter comprising a longitudinally separable fixture assembly, said assembly including a body having a bore extending longitudinally therethrough and a ball alignment block positioned on said body at a position within and spaced from the ends of said bore, said alignment block having an opening extending therethrough in axial alignment with said body bore and of a diameter to support said balls against movement in a direction transversely of said opening, said opening being of a length such that with a stack of three of said balls disposed therein in axial alignment therewith the ends of said stack project beyond the ends of said opening, and pistons telescopically inserted in opposite ends of said bore in axial alignment with said bore for movement into said bore into engagement with said ends of said stack for applying a compressive preload to said stack, said fixture assembly being longitudinally separable for removal from a position around said stack while said preload is maintained so that said pistons can subsequently be moved to further load said stack in compression without any restraining forces on said stack.

References Cited

UNITED STATES PATENTS 1,825,387   9/1931   Esnault-Pelterie _____ 73—94

FOREIGN PATENTS 648,203   1/1951   Great Britain.

RICHARD C. QUEISSER, Primary Examiner.

JAMES J. GILL, Examiner.

JAMES WILLIAMSON, Assistant Examiner.